Patented Aug. 31, 1926.

1,597,807

UNITED STATES PATENT OFFICE.

FRANK T. LAHEY, OF AKRON, OHIO.

PROCESS FOR THE UTILIZATION OF RUBBER BEARING PLANTS AND THE MATERIAL PRODUCED THEREBY.

No Drawing.     Application filed April 25, 1923. Serial No. 634,612.

This invention relates to new and novel composite materials and to new and novel process of producing the same; the invention having particular reference to the manufacture of articles composed in part of rubber.

The main object of the invention is to provide a new process of utilizing rubber bearing plants in the manufacture of various articles of commerce whereby such articles will be of the best quality and may be manufactured at a low cost.

By the ordinary method of manufacturing articles composed wholly or in part of rubber, the milky juice or latex of rubber bearing plants is collected, either by tapping the trees or by grinding or crushing the plants and removing the latex therefrom. The water is then evaporated from the latex or it is subjected to a process by which the rubber is separated and the crude rubber is shipped to manufacturing centers in sheeted or cake form. In the manufacture of a large variety of articles and particularly molded or sheeted products, cotton or other fibrous material must be used with the rubber to produce a satisfactory product.

In some species of rubber bearing plants rubber occurs in a solid state as in the shrub *Parthenium argentatum* which must be ground and subjected to a process by which the rubber is separated from the woody fiber, the fiber being a waste produce.

One object of this invention is to provide a material composed of the rubber bearing plant, using the entire plant or entire parts thereof without subjecting the same to any chemical change, thereby providing a strong, durable material which can be manufactured without resorting to the usual expensive methods above described and in which the fiber of the rubber bearing plant is utilized in place of the cotton or other expensive fibrous material which must be prepared and used in the manufacture of such articles by ordinary processes.

It is a further object of the invention to provide a new plastic material which is composed of the entire rubber bearing plant, vine, shrub or the leaves, twigs, roots or other parts of the rubber bearing trees or shrubs mixed with a vulcanizing agent, which material may be molded, shaped or otherwise formed and vulcanized to produce a large variety of articles such as imitation leather dielectrics, containers, buttons, knife handles, gears, pinions and many other products, the material being suitable for the manufacture of articles usually composed of hard rubber, bakelite, vegetable ivory and other substances of a similar nature.

It is to be understood that any rubber bearing plant, either in vine, weed, tree or any other plant form may be used in carrying out this invention, but such plants as the guayule in which the entire plant is ordinarily destroyed to remove the rubber therefrom are well adapted for use in my improved method. In using the guayule plant the entire shrub is ground or reduced to shreds or particles of the desired fineness. The moisture content is then removed from the ground mass either by evaporation or any desired process. Sulphur is added and the mass is thoroughly milled to produce a plastic material which is then formed into any desired shape and vulcanized.

Inasmuch as the various rubber bearing plants contain latex in different proportions and inasmuch as the fibrous body of each specie of the rubber producing plants has its own particular properties, the nature of the product will depend somewhat upon the nature of the rubber plant used in carrying out my improved process.

It will also be seen that the relatively flexibility or rigidity of the product may be varied by the amount of sulphur employed, the degree of heat and the period of vulcanization.

In producing certain products and particularly flexible products, it may be necessary or desirable to add to the ground rubber producing plant additional rubber which may be in the form of latex added before the ground mass is subjected to the evaporating process or it may be added to the plastic mass in the form of crude rubber or rubber in any form. Vulcanized rubber in ground or powdered form or any suitable form, regenerated rubber or any rubber substitute may be added if desired. Likewise fillers, oils, resins, albumenoids, proteids, clays, oxides, chlorides, acids and various other substances capable of being used in a rubber compound may be added if necessary to produce articles of the desired strength and texture.

The invention contemplates the use of the plastic material herein described as the product forming material or as the base of a compound to be used in manufacturing the product, but it may also be used as an ingredient in other rubber compounds.

It will thus be seen that I have provided a new plastic compound from which articles may be formed and vulcanized and a new process of manufacture and that this invention makes possible the production of a high grade, rubber product at an extremely low cost.

Having thus described my invention, what I claim as new and desire to secure by Letters Patent is:—

1. A material composed of a rubber bearing plant reduced to a plastic mass, dried and vulcanized.

2. That process of manufacturing a rubber article which consists in taking rubber bearing plants, grinding the same, removing the moisture therefrom, adding a vulcanizing agent, thoroughly mixing the resultant mass, forming the same into the desired shape and subjecting the formed article to vulcanization.

In testimony whereof I have hereunto set my hand.

FRANK T. LAHEY.